Sept. 10, 1935.  H. HILSENRATH  2,014,252
COMBINATION RECEPTACLE AND CUTTING GUIDE
Original Filed March 17, 1934
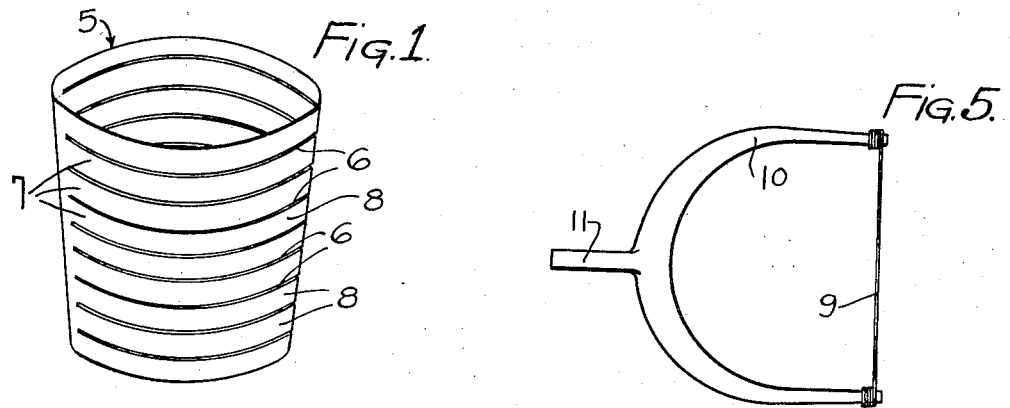
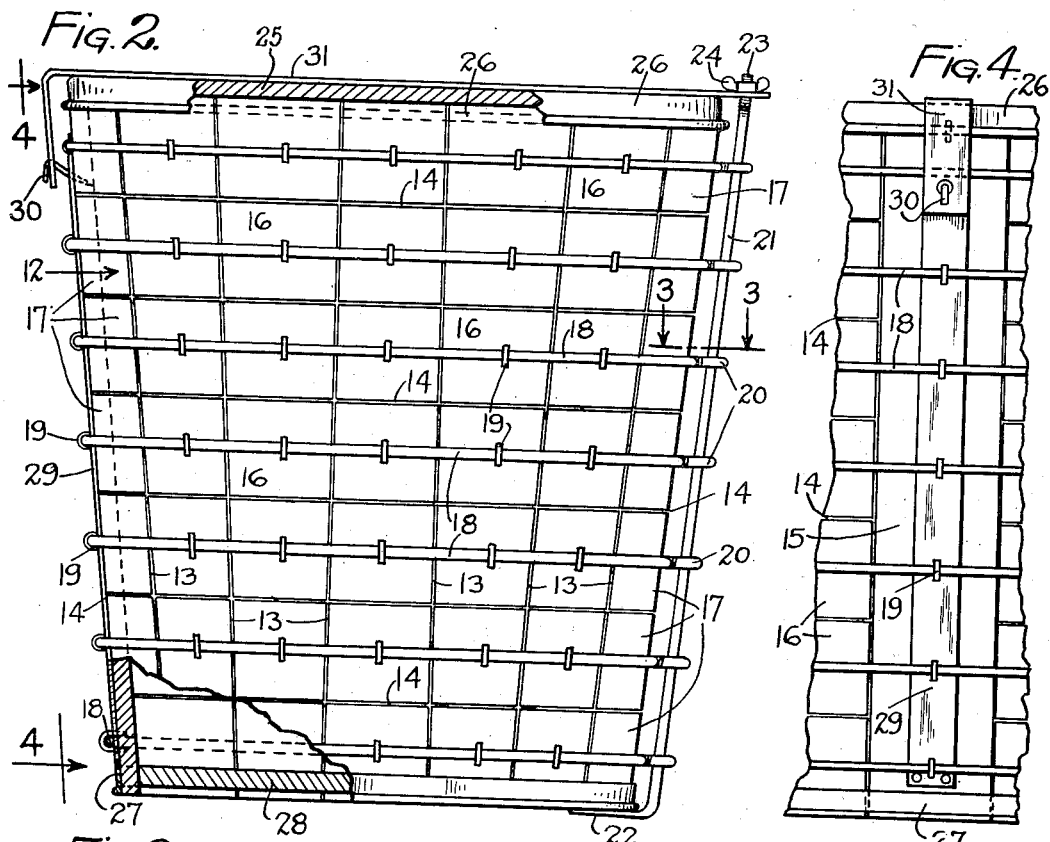
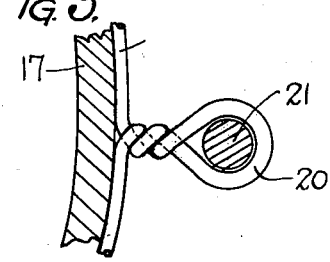
INVENTOR
HARRY HILSENRATH
BY John J. Lynch
ATTORNEY Patented Sept. 10, 1935

2,014,252

UNITED STATES PATENT OFFICE 2,014,252

COMBINATION RECEPTACLE AND CUTTING GUIDE

Harry Hilsenrath, Kew Gardens, N. Y.

Application March 17, 1934, Serial No. 716,081
Renewed June 5, 1935

3 Claims. (Cl. 31—22)

This invention relates to plastic material handling devices and in particular to a container having means to permit the dividing of a mass of material such as butter, cheese or the like, horizontally in layers preparatory to dispensing the material after further dividing by the use of an implement shown and described in application Serial Number 529,123 for U. S. Letters Patent, filed April 10, 1931 for Dispensing device, of which this application is a continuation in part and covers the mass dividing implements.

A particular object of my invention is to provide a receptacle through the use of which a mass may be packed and sold in sanitary condition and when received by the retailer, may be divided into horizontal layers without removing the same from the receptacle by the use of a cutter which operates through openings in the receptacle to cut the mass.

A still further object of my invention is to so construct a receptacle for the purpose referred to that it may be produced at small cost, may be used a number of times, and into which may be placed a mass of butter, for instance, that has been removed from a regular butter tub and which it is desired to cut into layers.

A still further object of the invention is to provide a device of the character referred to which is available for sanitarily packing and shipping a dairy product and permitting the cutting thereof without the same being handled. Also my improved device provides for the cutting of the mass into layers of predetermined thickness with accuracy so that a block of the material may be later removed that will be exactly correct in weight.

With these and other objects in view, the invention comprises certain constructions hereinafter described and then particularly pointed out in the claims and a preferred embodiment of my invention is illustrated in the accompanying drawing, in which,—

Figure 1 is a view in perspective of a cutting guide through the medium of which a plastic mass can be cut in layers accurately.

Figure 2 is a view in elevation of a receptacle constructed to permit shipment of the material therein and subsequent cutting thereof.

Figure 3 is an enlarged section taken on the line 3—3 of Figure 2 showing the method of securing the retaining rings and locking bar in holding relation.

Figure 4 is a view of part of the receptacle taken on the line 4—4 of Figure 2 and shows the uncut part and the attachment thereto of the band and hook member which assists in maintaining the receptacle parts in rigid relation, and Figure 5 is a view of a cutter employed in layering a mass that is held in the receptacle or guide.

Referring to the drawing in detail, and in particular to Figure 1, 5 indicates a guide which is in the form of a receptacle and into which a plastic such as butter for instance, is placed when removed from a tub or container received by the retailer. This guide 5 is preferably made of non-corrosive material and constitutes a tapered receptacle slotted as at 6 around the periphery thereof with the exception of the narrow unslotted portion 7 which holds the bands 8, 15 defined by slots 6, in proper relation.

The slots 6 are spaced apart so that when the implement illustrated in Figure 5 is employed to cut the material in the receptacle 5, layers of uniform thickness are provided throughout the depth of the material so that a cutting implement may be subsequently employed to remove from the uppermost layer a block of predetermined weight.

As many layers may be cut as desired depending upon the number of slots 6 in the receptacle 5 and the bands 8 of the guide or receptacle form accurate edge guides for the wire 9 which is drawn through the receptacle to layer the mass. The implement employed as a cutter is not novel and consists essentially of a U-shaped frame 10, having a handle 11 and a wire 9, the wire being taut between the legs of the frame and of thin gauge to readily cut the mass as it is passed through the slots 6 of the receptacle or guide 5.

In order to facilitate handling and shipping of the material and at the same time permit cutting and dispensing of the mass without having the mass come into contact with the hands, thus keeping the material in a sanitary condition, I have constructed a combination guide and receptacle 12, which may be made of wood or any non-corrosive material and which is tapered. The wall of the receptacle is staved vertically as at 13 at spaced points around the receptacle and also cut horizontally at spaced points as at 14 except in the portion 15 which is solid for the purpose of holding the parts of the receptacle together. This cutting of the major portion of the receptacle provides a flexible structure that lends itself to the easy dispensing of the material, as the pieces of material after cutting may be readily removed from the receptacle.

Also, this cutting or dividing of the wall consequently provides the individual wall pieces 16 which are in each zone or band section 17, secured together by the wire rings 18, one of which is provided for each zone or section 17. The wire rings pass entirely about the receptacle 12 and are secured to each piece 16 by a suitable staple 19 and also are twisted to provide an eye 20 in each ring for retaining a vertically positioned lock rod 21, which passes through each of the eyes 20. This rod 21 has a foot 22 which engages beneath the bottom edge of the receptacle 12 and which at its upper end is threaded as at 23 to receive the wing nut 24.

The top of the receptacle and guide is closed by the usual tub cover 25 bound by the edge metallic beaded binding strip 26. The bottom of the tub is also reinforced by a similar binding strip 27, the bottom being indicated by the numeral 28. The uncut portion 15 of the receptacle has secured thereto the reinforce strip 29 which is secured by the staples 19 which secure the rings 18 to the separate parts of the guide.

Through this guide wall near the top of the same is secured a hook 30 to which is secured the end of a top strap 31 which extends across the top 26 of the receptacle and engages the lock rod 21 to which it is secured by the wing nut 24.

This receptacle and guide combination tub is packed at the dairy establishment and shipped to the retailer and if the mass has not been already cut into layers with the cutting implement, the retailer may do this by first removing the rod 21 by releasing the wing nut 24 and then drawing the cutter through each slot 14 between the zones 17 to divide the mass into layers from which smaller pieces or blocks may be subsequently removed. The narrow nature of the solid piece 15 of the receptacle permits the wire to be drawn completely through the mass each time and the construction also permits each zone of the receptacle to be bent back out of the way as each layer is removed. This is permitted by making the strip 29 out of malleable material or metal.

It is evident therefore that I have constructed a combination receptacle and cutting guide which serves as a sanitary container and which can be shipped and then used as a guide to layer the material therein preparatory to dispensing the same. Also the simplified construction permits the ready insertion into the receptacle of a mass that has been removed from another tub for the purpose of cutting the same, and also accurate division of the layers is obtained which materially assists in the final cutting of the material in block form to a predetermined weight.

My invention is not to be restricted to the precise details of construction shown since various changes and modifications may be made therein without departing from the scope of the invention or sacrificing the advantages derived from its use.

What I claim is:

1. In a device of the character described, a receptacle having a vertical solid wall portion, the wall of the receptacle being slotted horizontally at spaced points from bottom to top of the receptacle and said slots terminating at said solid wall portion, and constituting guide means for a cutter to be passed therethrough to cut the contents of the receptacle into layers, rings passing around the band sections defined by said slots for reinforcing said sections, and a cover for the receptacle.

2. In a device of the character described, a receptacle having vertical staves, forming the wall thereof, said wall being slotted horizontally at spaced points from bottom to top of the receptacle and said slots terminating at opposite sides of one of the staves, reinforcing rings secured to the staves between said slots and having eyes therein in vertical alignment, a cover for the receptacle and means passing through said eyes for securing said cover in place.

3. In a device of the character described, a receptacle having vertical staves forming the wall thereof, said wall being slotted horizontally at spaced points from bottom to top of the receptacle and said slots terminating at opposite sides of one of the staves, reinforcing rings secured to the staves between said slots and having eyes therein, a cover for the receptacle, a strip extending across the cover, a hook at one side of the receptacle engaging said strip, a lock rod passing through the ring eyes and through the strip, a foot on the rod extending beneath said receptacle, and a reinforcing strip on the uncut stave.

HARRY HILSENRATH.